Patented June 2, 1931

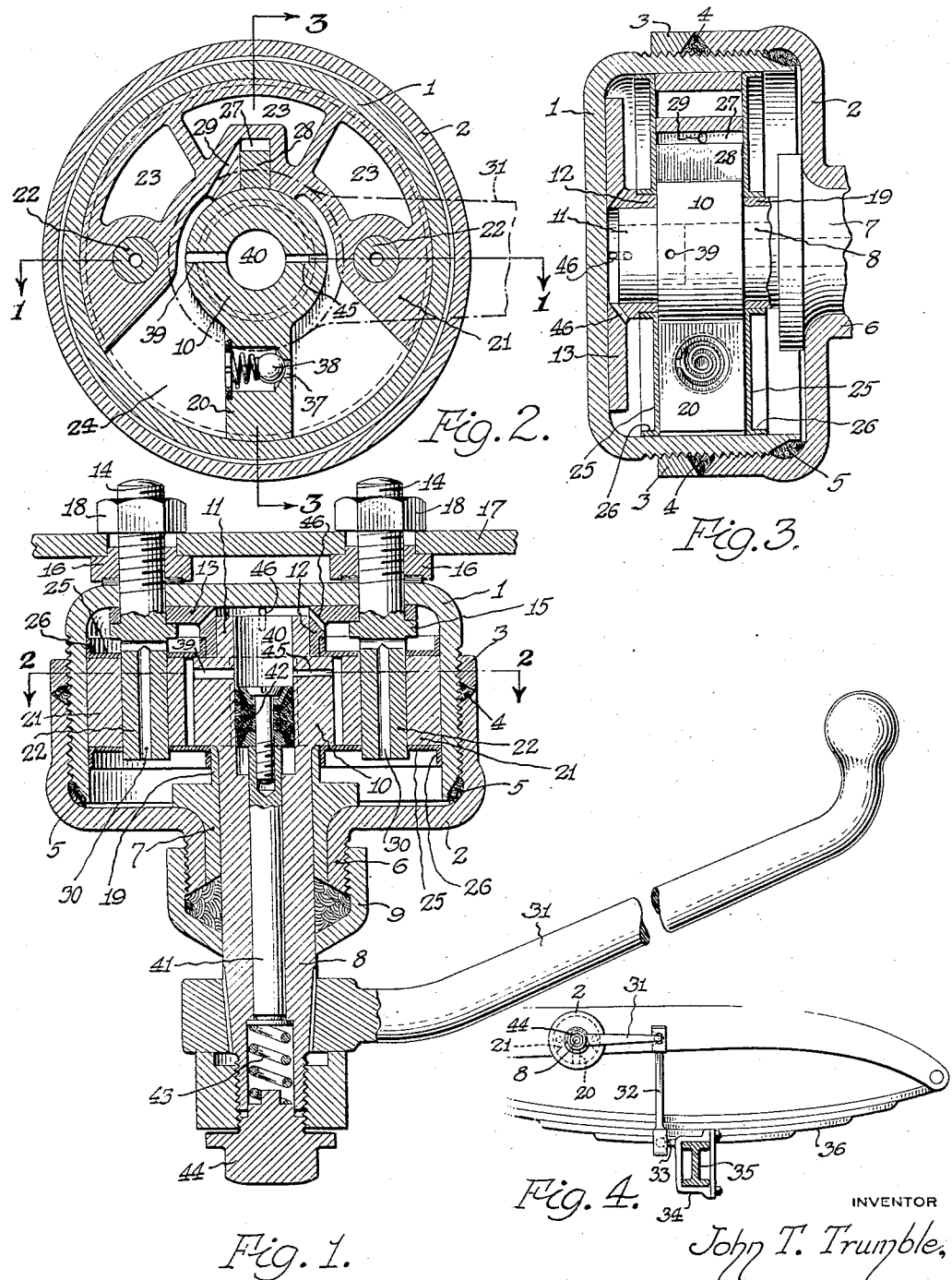

1,807,945

UNITED STATES PATENT OFFICE

JOHN T. TRUMBLE, OF DETROIT, MICHIGAN

SHOCK ABSORBER

Application filed June 8, 1929. Serial No. 369,318.

This invention relates to a device for absorbing the shocks to which a spring suspended motor vehicle body is subjected and to check the rebound of the suspension springs upon deflection, said device being of what is known as the "hydraulic" type employing a liquid as the resistance to the movement of an enclosed movable member actuated by the relative movement between axle and vehicle frame upon deflection of the spring suspension.

In devices of this character, a very high internal pressure is at times developed, and difficulty is experienced in preventing leakage of the liquid past the movable member in the casing, thus impairing the efficiency of the device, and leakage through joints, bearings, etc., causing depletion of the liquid and further impairment of efficiency.

It is an object of the present invention to provide a construction wherein such leakages are prevented and an arrangement is secured whereby the device will offer little resistance to deflection of the vehicle spring suspension under load but will act to effectually check the rebound of such suspension, the arrangement being such that the resistance offered by the device will be in proportion to the amount of spring deflection and violence of the resultant shock. It is also an object to provide a very simple, compact and efficient construction and one embodying certain other new and useful features, all as hereinafter more fully set forth.

With the above and other ends in view, the invention consists in the matters hereinafter set forth and more particularly pointed out in the appended claims, reference being had to the accompanying drawings in which Figure 1 is an axial section substantially upon the line 1—1 of Fig. 2, through a device illustrative of an embodiment of the present invention;

Fig. 2 is a transverse section substantially upon the line 2—2 of Fig. 1;

Fig. 3 is a vertical longitudinal section substantially upon the line 3—3 of Fig. 2, and Fig. 4 is a diagrammatic view illustrating the manner of attaching the device embodying the invention in place upon a motor vehicle.

The present device includes a cylindrical casing which comprises two cup-shaped stampings 1 and 2, the cylindrical side wall or flange of the part 1 being externally screw-threaded to engage internal screw-threads on the part 2, the cup 1 being screwed into the cup 2 to form a liquid tight chamber, the cups being locked together by an external locking ring 3 with a packing 4 inserted between the beveled edges of the ring 3 and cup 2 to prevent leakage through the threaded connection between the cups. To further guard against leakage through this connection, the inner edge of the cup 1 is beveled inwardly and a packing 5 is placed within the angle between this beveled edge and the rounded inner corner of the cup 2.

From the bottom or end wall of the cup a hub portion 6 is struck outwardly and within this hub is fitted a bearing bushing 7 having an axial bore to receive an operating shaft 8, the outer end of the hub being externally screw-threaded to receive a stuffing box 9, the outer ends of said hub and bushing being beveled inwardly and packing placed within the stuffing box opposite said beveled ends to provide a gland for preventing the escape of liquid through the bearing around the shaft.

The shaft 8 is formed with an integral cylindrical head 10 positioned centrally within the casing and an extension 11 of the shaft at the side of the head opposite the shaft 8, fits within a bearing or hub portion 12 of a bearing plate 13 secured within the chamber of the casing against the bottom wall of the cup 1 by means of bolts 14 passing through openings in said plate and openings in said wall, each bolt being formed with an annular rib or shoulder 15 adapted to engage the inner side of the bearing plate 13, and each bolt is screw-threaded at its outer end to receive nuts 16 adapted to be turned up on the bolts against the end wall of the cup 1 and thus securely hold the bolts in place and also secure the bearing plate 13 against the end wall of the cup.

The bolts 14 are of a length to provide means for attaching the device to a suitable support, such as the channel frame 17 of a motor vehicle, said channel being provided with openings through which the bolts extend with nuts 18 screwed on to the bolts 14 against the inner face of the flange of the channel member.

The head 10 on the shaft 8 is positioned midway of the length of the chamber of the casing by providing an integral tubular extension 19 on the inner end of the bushing 7 to engage one side of the head, the opposite side of said head being engaged by the inner end of the hub 12 of the bearing plate 13. This head 10 is formed with an integral laterally extending vane 20 serving as an oscillating piston within the chamber of the casing, the outer end of this vane fitting closely against the inner surface of the annular wall of the cup 1. The arrangement is such that this vane or piston oscillates through but a portion of a complete circle and to fill the space within the chamber of the casing from end to end of the movement of the vane and around and above the head 10, a segmental shaped filler block 21 is fitted within the chamber of the casing and is held in position therein in the plane of oscillation of the vane, by being provided with openings to receive the extended inner end portions 22 of the bolts 14, said bolts thus forming studs for anchoring the filler block 21 and holding it accurately positioned within the chamber with its side faces spaced a considerable distance from the end walls of the chamber. Upon rotative movement of the shaft 8, the vane 20 which is integral therewith is therefore oscillated within the space between the ends of the segmental filler block which is located in the chamber in the plane of oscillation of said vane. For the purpose of reducing the weight of this filler block, it may be cored out, as shown at 23.

To provide end walls within the chamber of the casing to engage the ends of the filler block 21 and also close the ends of the space within which the vane 20 oscillates, thus forming a cylinder 24 or space to receive a suitable liquid adapted to be confined within this space by said walls so that the oscillatory movement of the vane will be resisted by this liquid, a pair of annular members 25 is provided, these members being formed of sheet metal with laterally turned edge flanges 26 and these sheet metal rings are set within the chamber of the casing, fitting closely at their outer edges against the inner surface of the wall of the cup 1 and against the opposite sides of the filler block 21 and against the ends of the vane 20. In order to hold these annular members or walls firmly against the ends of the filler block and vane so that the fluid will be prevented from passing the ends of the vane upon oscillation thereof, the liquid which completely fills the casing and put under pressure by the oscillation of the vane, is permitted to pass into the space between one of the walls 25 and one end of the casing, thus forcing this annular thin metal wall firmly against the end surfaces of the filler block and vane and by creating a liquid pressure between the other thin wall 25 and opposed end wall of the casing, said thin wall is prevented from springing away from said block and vane and causing leakage. The one of these thin annular wall members is held in place but free to move toward and from the filler block and vane, by the end portions 22 of the bolts 14 which pass through openings in said annular wall members and also in said block. The inner edges of these wall members fit closely about the hub portion 12 of the bearing member 13 and about the tubular sleeve 19 on the bushing 7, so that when the liquid in the spaces in the casing between these walls and the ends of the casing, is put under heavy pressure by the operation of the vane 20, these thin annular walls will be forced tightly against the ends of the filler block and vane and thus prevent any of the liquid from passing from one side of the vane to the other during the oscillation thereof.

To prevent the liquid from passing round the upper side of the head 10 and thus flowing from one side of the vane to the other, the filler block 21 is formed with a channel 27 to receive a sliding abutment or block 28 adapted to seat at its inner edge upon the surface of the head. A small passage 29 is formed in the filler block with one end of the passage communicating with the space 24 and its opposite end with the outer end of the channel 27 so that the liquid under pressure may flow into this channel 27 and thus force the abutment 28 into firm contact with the surface of the head 10, making a tight joint therewith and preventing the liquid from flowing from one side to the other of the vane. Communication between the spaces at the ends of the casing between the said ends and the annular wall members 25, is provided by forming each of the studs 22 with an axial bore 30 and the inner end of this bore communicates with a cross bore opening into the space at the other end of the casing. The liquid may therefore flow from one of these end spaces to the other and thus the pressure on the annular wall members 25 will be equalized to hold them in firm contact with the ends of the filler block and vane.

As illustrated in Fig. 4, the device is adapted to be attached to a motor vehicle by securing the casing to the chassis frame 17 and providing the outer end of the shaft 8 with an arm 31 secured thereto and extending laterally therefrom, said arm being connected at its free end by a link 32 with a suitable stud 33 on a clip 34 applied to the vehicle axle 35 upon which axle the spring 36 supporting the chassis frame, is secured.

Deflection of the spring 36 under load, therefore, causes the frame to approach the axle and in doing so to rotate the shaft 8 by means of the arm 31 and connecting link 32, and upon the recovery or rebound of the spring 36 the shaft will be turned in an opposite direction. Therefore the vane 20 which is integral with the shaft 8 is being constantly oscillated in the casing as the suspension springs of the vehicle are caused to deflect by the unevenness of the road surface. The shock absorbing device should not, however, retard to any great extent, the flexure of the springs under load, particularly with the slight movements which are caused by slight unevenness in the road, but when the vehicle wheel suddenly drops into a deep hole, the sudden flexing of the spring should be retarded to a limited extent and the rebound of the spring should be effectually checked. In order to permit the suspension springs 36 to deflect under load and under normal conditions with but slight retardation, an opening 37 is provided in the vane 20 and the passage through this opening is controlled by a ball check 38 adapted to seat and close the opening upon movement of the vane in one direction, and to unseat during the opposite motion of the vane and permit the liquid to pass through the opening 37 into the space rearwardly of the vane in the direction of its movement.

Upon deflection of the spring suspension and downward movement of the chassis frame, the check valve 38 is so arranged in the vane that it will be opened by the pressure of the liquid and therefore but small resistance to this downward movement of the chassis will be offered by the liquid in the chamber at the forward side of the vane in the direction in which the vane is moved by such movement of the frame.

Upon rebound or recoil of the spring 36, this upward movement of the frame is effectually checked by the seating of the valve 37 which prevents the liquid from passing from the then forward side of the vane to the rear side thereof. However, this checking of the rebound should not be too sudden but should be gradual, and therefore, a comparatively large passage 39 is provided in the hub 10, said passage opening into the space forwardly of the vane in this direction of its movement and communicating at its inner end with a bore 40 extending inwardly from the inner end of the shaft extension 11 into and through the head and for a distance into the shaft 8. This provides a limited relief for the pressure created in the chamber ahead of the vane 20. From the inner end of the bore 40 the shaft 8 is axially bored throughout its length to receive a rod 41 and on the inner end of this rod is a piston head 42 adapted to slide within the bore 40. The extreme outer end of the shaft 8 is formed with an enlarged axial bore to receive a spring 43 which is confined within this bore between the outer end of the rod 41 and a cap 44.

Liquid under high pressure passing through the passage 39 into the bore 40 creates a pressure against the end of the piston head 42 and when a sufficient pressure is built up, this piston and rod 41 will be moved endwise against the action of the spring 43, thus increasing the active space within the bore 40 and relieving the pressure to some extent. This pressure is also relieved by providing a passage 45 in the head 10 of lesser diameter than the passage 39 and opposite said passage, said passage 45 opening at one end into the bore 40 and at its opposite end into the space at the rear side of the vane 20. Therefore upon severe rebound of the suspension springs, the piston 42 will be moved slightly so that this rebound will not be too suddenly checked, the piston moving within the bore 40 to increase the space for the liquid. By adjusting the tension of the spring 43 by means of the cap 44, this checking action may be accurately adjusted.

In order to equalize the liquid pressure within the bore 40 and the space between the wall member at this side of the head and the end of the casing, a series of small passages 46 is formed in the hub portion 12 of the bearing plate 13, said passages affording communication between the open end of the bore and the space between the annular wall 25 and the inner end of the cup 1.

When a very sudden and extreme rebound occurs, this rebound being so quick and severe that the liquid ahead of the vane can not get away through the several passages quick enough to relieve the extreme pressure set up in advance of the vane, the annular wall 25 at the outer side of the piston vane will be moved away slightly from this end of said vane and permit enough of the liquid to bypass said end to relieve the pressure and prevent breakage of the parts and sudden checking of the rebound, this movement of said wall being permitted by the difference in pressure ahead of the vane and the pressure in the chamber between this wall and the end of the casing.

Leakage past the end of the vane 20 is therefore effectually prevented under normal conditions by the annular wall member 25 which is held in firm contact with the end of the vane by the pressure of the fluid within the space at the end of the casing, the passages 30 equalizing this pressure upon the two annular wall members. Further leakage past the vane around the upper side of the head 10 is effectually prevented by means of the movable abutment 28 which is also moved by liquid pressure, and the sudden checking of a severe rebound is prevented and cushioned by means of the piston 42 which yields within the bore 40 relieving the pressure of liquid in the chamber between the walls 25 and casing ends so that the extreme pressure applied to the liquid ahead of the vane in chamber 24 by the movement of the vane upon recovery of the spring suspension and sudden, severe upward movement of the chassis frame will force this wall away from the end of the vane and permit the liquid to by-pass to a limited extent. This checking of rebound may be adjusted to suit the road conditions by a simple adjustment of the cap 44 which will increase or decrease the tension of the spring 43. All of the space within the casing is filled with liquid and the several chambers are all in constant communication through more or less restricted passages and were it not for these communicating passages, the vane could not move, but due to the arrangement of these passages and the check valve 38 in the vane 20, the movement of the vane in one direction is resisted but slightly, while in the other direction or the direction of rebound, the checking action of the device is applied gradually due to the arrangement and size of the passage and also due to the yielding action of the wall 25 permitted by the piston 42.

Obviously changes may be made in the specific construction and arrangement of parts without departing from the spirit of the invention and within the scope of the appended claims, and as such changes are contemplated, I do not wish to limit myself to the particular construction shown.

Having thus fully described my invention, what I claim is:—

1. In a device of the character described, the combination of a casing to contain a liquid, a movable member in said casing positioned midway between the ends thereof, and a wall at each side of said movable member for confining liquid within the path of movement of said movable member, one of said walls being arranged to be moved by pressure of liquid in the spaces between said wall and casing end, into contact with said movable member.

2. In a device of the character described, the combination of a cylindrical casing, an oscillatory member mounted for oscillation in said casing, and means in said casing for confining liquid within the path of oscillation of said oscillatory member including a movable wall engaging an end of said member and arranged to be moved by liquid pressure in the space between said wall and casing end, into contact with said oscillatory member to prevent by-passing of liquid past said member upon oscillation thereof, said casing being arranged to provide restricted communication between the space in which said member oscillates and said space between said wall and casing end.

3. In a device of the character described, the combination of a liquid tight casing, an oscillatory member mounted for oscillation in said casing, and means in a movable wall spaced from an end wall of said casing for confining liquid within the path of oscillation of said member, said member being provided with a passage for conducting liquid from the space ahead of said member in the direction of its movement into said space between said casing end and movable wall, to force said wall into contact with said member and prevent by-passing of liquid past said member.

4. In a device of the character described, the combination of a liquid tight casing, an oscillatory member mounted for oscillation in said casing, a member forming a wall to engage one end of said oscillatory member within said casing for confining liquid within the path of movement of said member, said wall being spaced from an end wall of said casing, said space between said wall and casing end being in restricted communication with the space in which said member oscillates, and relief means for relieving high liquid pressure ahead of said member in the direction of its oscillation, said relief means including a member within a chamber in restricted communication with said space in which said oscillatory member oscillates, said relief member being moved by such pressure of liquid.

5. In a device of the character described, the combination of a liquid tight casing, an oscillatory member mounted for oscillation in said casing, means within said casing for confining liquid within the path of movement of said member, and relief means for relieving high liquid pressure ahead of said member in the direction of its oscillation, said relief means including a piston reciprocable within a bore having restricted communication with said space ahead of said member in the direction of its reciprocation and yieldable means to yieldingly resist the movement of said piston.

6. In a device of the character described, the combination of a cylindrical casing, an oscillatory member mounted for oscillation in said casing, and walls within said casing for confining liquid within the path of oscillation of said member, one of said walls being arranged for movement by liquid pressure generated by oscillatory movement of said member, into contact with said member to prevent by-passing of the liquid past said member upon oscillation thereof.

7. In a device of the character described, the combination of a cylindrical casing formed in two parts adapted to be screwed one into the other to form a liquid tight chamber, an oscillatory member within the casing having an operating shaft extending through an opening in the casing and having a bearing therein at each end of the casing, thin sheet metal walls in the casing engaging opposite sides of said oscillatory member, said oscillatory member being formed with a restricted passage communicating with the space in the casing in advance of said oscilatory member for conducting liquid therefrom under pressure laterally of the oscillatory member against said thin walls to hold the same in firm contact with the ends of said member and form a liquid chamber in the path of oscillation of the oscillatory member.

8. A device of the character described comprising a cylindrical casing having bearings at the ends thereof, an operating shaft in said bearings, an oscillatory member on said shaft intermediate the ends of the casing, annular walls in the casing for confining liquid within the path of movement of the oscillatory member, said walls being spaced apart and from the ends of the casing to provide a chamber between each wall and casing end adapted to receive liquid under pressure to force one of said walls into contact with the ends of said oscillatory member, said chambers being in communication with each other.

9. A device of the character described, comprising a cylindrical casing, transverse annular sheet metal walls in the casing spaced apart and each spaced from an end of the casing, an oscillatory member within the casing between said annular walls, a segmental filler block within the casing between said walls, said walls and filler block forming a chamber within which the oscillatory member oscillates, said spaces between said annular walls and the ends of the casing being connected to receive liquid under pressure, certain of said annular walls being movable toward said filler block and oscillatory member to prevent leakage past the ends of the oscillatory member from one side to the other thereof.

10. In a device of the character described, the combination of a cylindrical casing, an operating shaft mounted within the casing and extending therefrom, an oscillatory member on said shaft positioned in spaced relation to the ends of said casing, a filler block within the casing in the plane of oscillatory movement of said member, annular walls within the casing in contact with the end faces of said filler block and oscillatory member, a movable member within a bore in said shaft, said oscillatory member being formed with a restricted passage affording communication between the space within which said member oscillates and said bore and having communication with the spaces at the ends of the casing between said walls and casing ends to conduct liquid under pressure thereto.

11. In a device of the character described, the combination of a cylindrical casing, studs extending through openings in an end wall of said casing, annular walls extending transversely of the casing and mounted upon said studs, a segmental filler block within the casing between said walls and mounted upon said studs, said walls and filler block forming between them a chamber within which the oscillatory member oscillates, said studs being formed with passages affording communication between the spaces at the ends of the casing between said ends and walls, said oscillatory member being formed with a restricted passage affording communication between said chamber within which the oscillatory member oscillates and the spaces at the ends of the casing between said walls and casing ends.

12. In a device of the character described, the combination of a cylindrical casing formed in two parts having screw-threaded connection, one of said parts being formed with a bearing hub, a shaft extending through said bearing hub and having an integral head with a vane integral with said head, a bearing plate within the casing providing a bearing for the end of said shaft, said shaft being formed with an axial bore opening through the inner end of the shaft and said bearing plate being formed with passages affording communication between the interior of the casing and said bore, said head being formed with a restricted passage opening into said bore, a pair of thin annular walls surrounding said shaft and fitting within said casing, said walls being spaced apart and spaced from the ends of the casing, studs extending through an end wall of the casing and through openings in said thin annular walls, and a segmental filler block between said annular walls and mounted upon said studs, said annular walls and said filler block forming between them a segmental chamber within which the oscillatory vane oscillates.

13. In a device of the character described, the combination of a cylindrical casing, an operating shaft mounted within said casing and extending therefrom, a pair of spaced apart annular walls within the casing, said walls being spaced from the ends of the casing, a segmental filler block within the casing between said annular walls, said walls and filler block together forming a segmental chamber, a vane on said shaft within said segmental chamber for oscillation therein, said vane engaging at its outer end the inner surface of the annular wall of the casing, said vane being formed with a transverse opening for the passage of liquid from one side to the other of the vane, a check valve for closing said opening in one direction of the movement of said vane, an abutment block carried by said filler block and adapted to engage a circular head portion of the vane, said filler block being formed with a passage communicating with the chamber in which the blade oscillates and leading to the guide way for the abutment block for conducting liquid under pressure to said guide way and forcing the abutment block into firm contact with the hub of the vane, and means applied to the outer end of said shaft for turning the same and oscillating said vane.

In testimony whereof I affix my signature.

JOHN T. TRUMBLE.